(12) United States Patent
Duarte

(10) Patent No.: US 7,093,201 B2
(45) Date of Patent: Aug. 15, 2006

(54) LOOP MENU NAVIGATION APPARATUS AND METHOD

(75) Inventor: Matias Duarte, San Francisco, CA (US)

(73) Assignee: Danger, Inc., Palo Alto, CA (US)

(*) Notice: Subject to any disclaimer, the term of this patent is extended or adjusted under 35 U.S.C. 154(b) by 435 days.

(21) Appl. No.: 09/948,219

(22) Filed: Sep. 6, 2001

(65) Prior Publication Data

US 2003/0043206 A1 Mar. 6, 2003

(51) Int. Cl.
 *G06F 3/14* (2006.01)
(52) U.S. Cl. ............... 715/853; 715/864; 715/854; 715/828; 715/810; 715/834
(58) Field of Classification Search ........... 345/853, 345/864, 854, 841, 834, 830, 835, 837, 817–820, 345/823, 810, 828–829; 715/853, 864, 854, 715/841, 834, 830, 835, 837, 817–820, 828, 715/810, 829, 784, 785, 786, 823
See application file for complete search history.

(56) References Cited

U.S. PATENT DOCUMENTS

| | | | |
|---|---|---|---|
| 4,755,809 A | | 7/1988 | Ikegami et al. |
| 5,615,325 A | * | 3/1997 | Peden ..................... 345/854 |
| 5,825,353 A | * | 10/1998 | Will ....................... 715/864 X |
| 5,854,629 A | | 12/1998 | Redpath |
| 5,940,076 A | * | 8/1999 | Sommers et al. .......... 345/834 |
| 5,958,008 A | | 9/1999 | Pogrebisky et al. ........ 709/223 |
| 5,986,638 A | * | 11/1999 | Cheng ..................... 715/835 X |
| 6,005,573 A | | 12/1999 | Beyda et al. |
| 6,028,600 A | * | 2/2000 | Rosin et al. ............. 345/854 X |
| 6,064,383 A | * | 5/2000 | Skelly ..................... 345/835 X |
| 6,104,400 A | | 8/2000 | Halachmi et al. ........... 345/356 |
| 6,188,406 B1 | | 2/2001 | Fong et al. |
| 6,219,053 B1 | * | 4/2001 | Tachibana et al. .......... 345/835 |
| 6,993,727 B1 | * | 1/2006 | De Ceulaer et al. ..... 715/810 X |
| 2001/0045965 A1 | * | 11/2001 | Orbanes et al. ............. 345/841 |
| 2002/0186251 A1 | | 12/2002 | Himmel et al. |
| 2003/0043198 A1 | | 3/2003 | Delpuch |

FOREIGN PATENT DOCUMENTS

| | | |
|---|---|---|
| CN | 1263425 A | 8/2000 |
| EP | 0 702 331 A2 | 3/1996 |
| EP | 0 943 982 A1 | 9/1999 |
| EP | 0944218 A1 | 9/1999 |
| EP | 1 028 570 A1 | 8/2000 |
| GB | 2 322 508 A | 8/1998 |
| WO | WO 99/37075 | 7/1999 |

* cited by examiner

*Primary Examiner*—Raymond J. Bayerl
(74) *Attorney, Agent, or Firm*—Blakley, Sokoloff, Taylor & Zafman, LLP

(57) ABSTRACT

A curved-listing file hierarchy and a preview window for more efficiently displaying file hierarchy information on a data processing device. Curved-listing file hierarchies may allow more elements of a file hierarchy to be displayed in a smaller space. This may be especially useful for the smaller screens of some data processing devices like Personal Digital Assistants and cellular phones. A preview screen may allow a user to view preview information on a file in the hierarchy without actually opening the file.

21 Claims, 11 Drawing Sheets

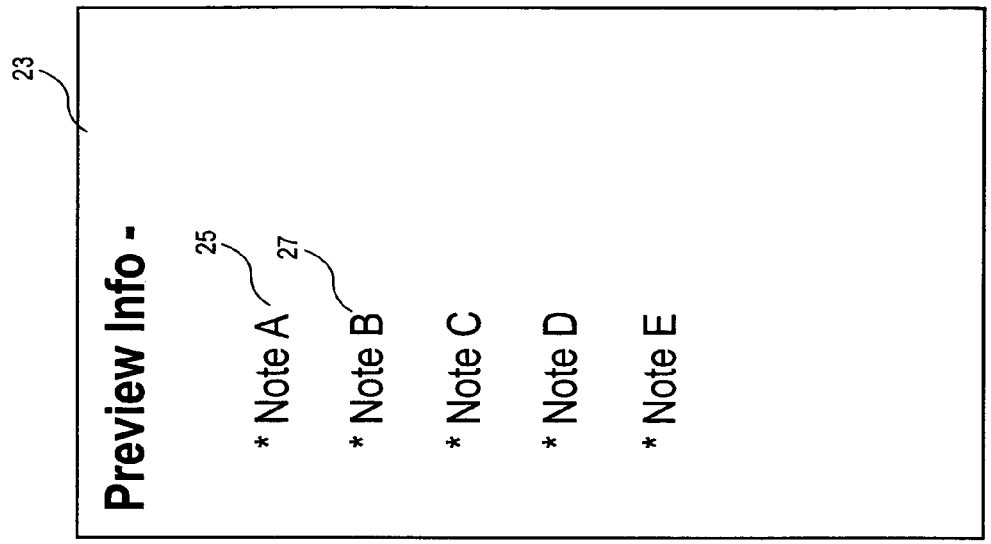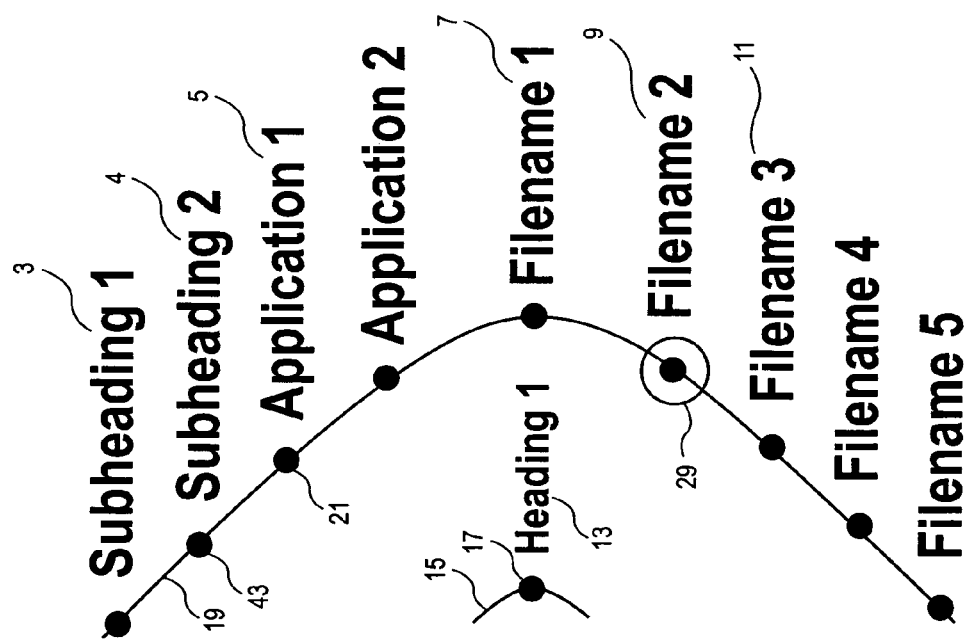
FIG. 2

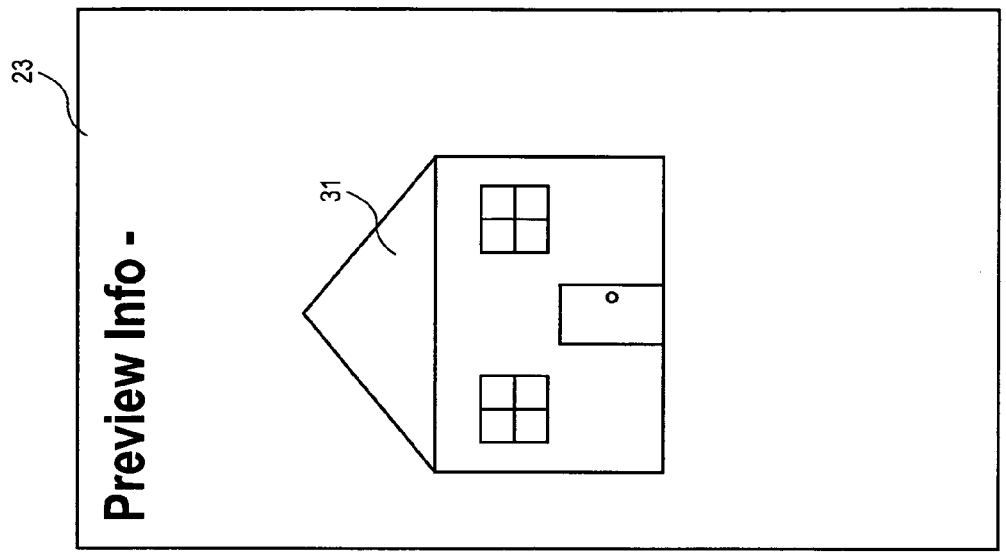
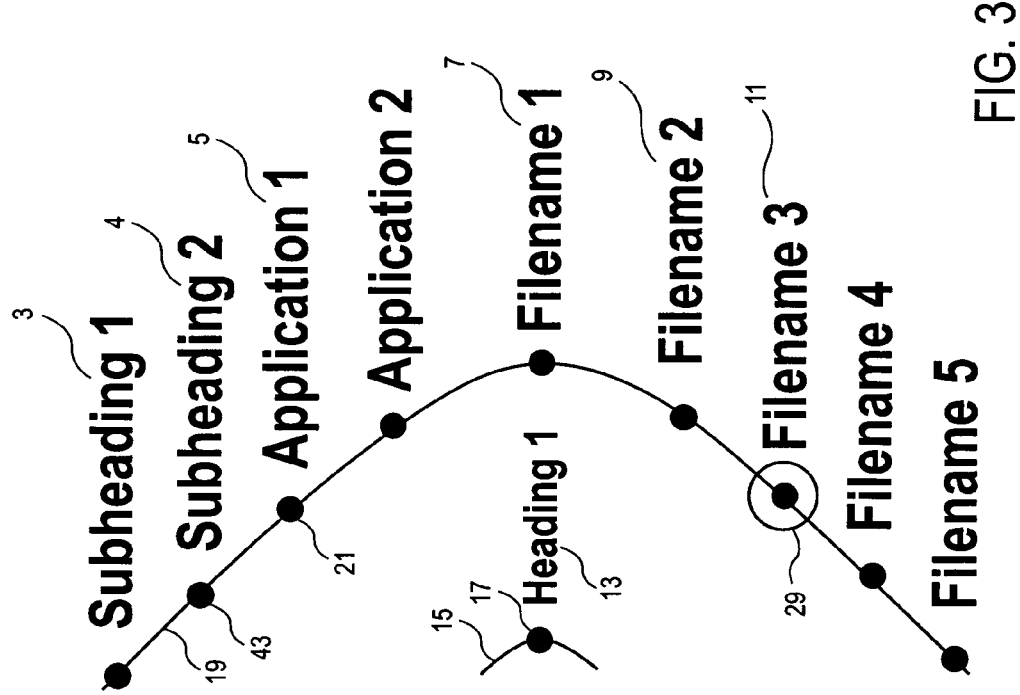
FIG. 3

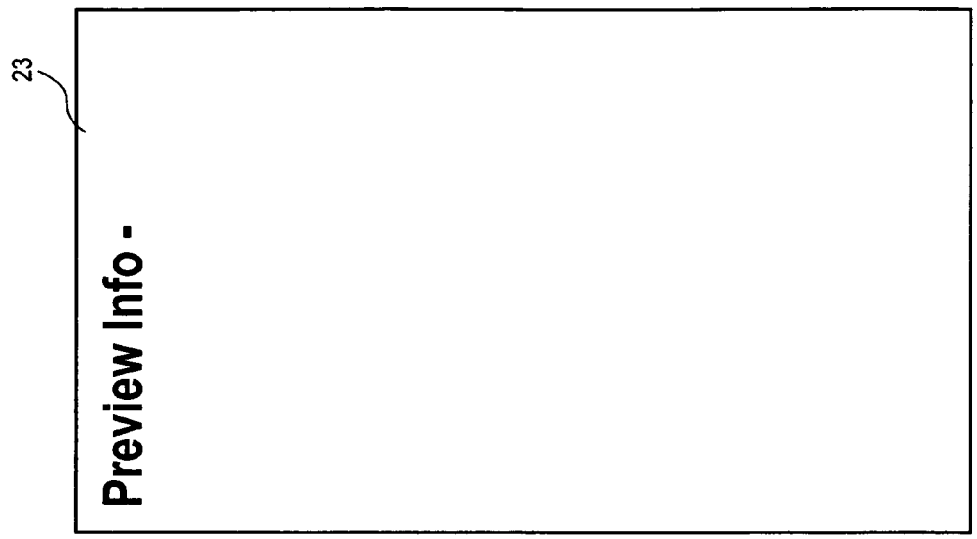
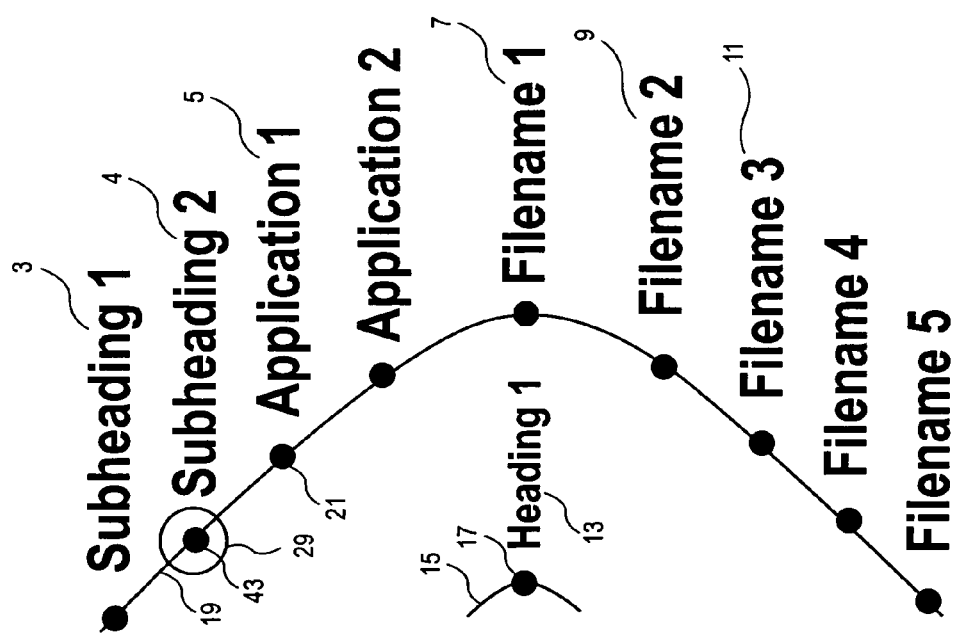
FIG. 5

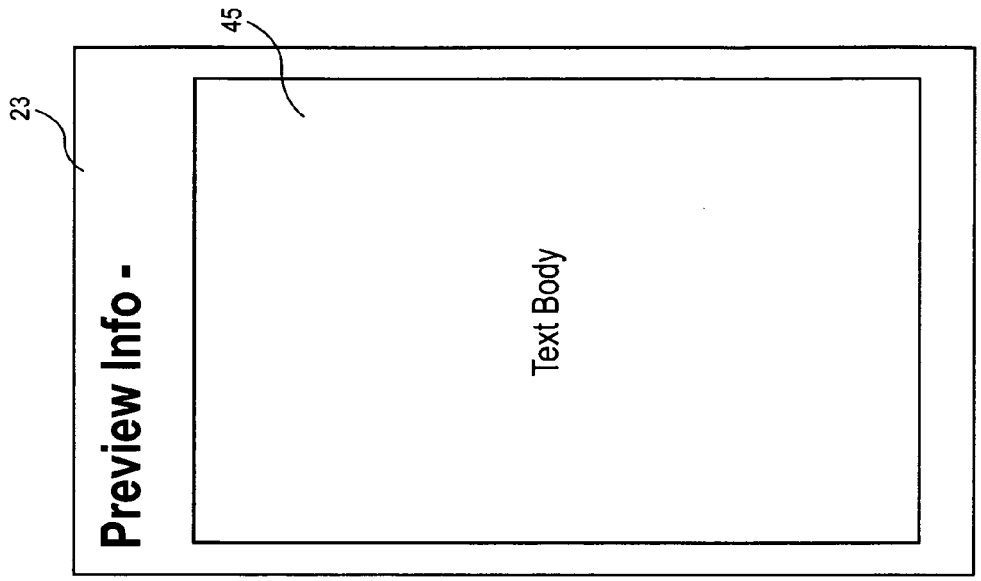
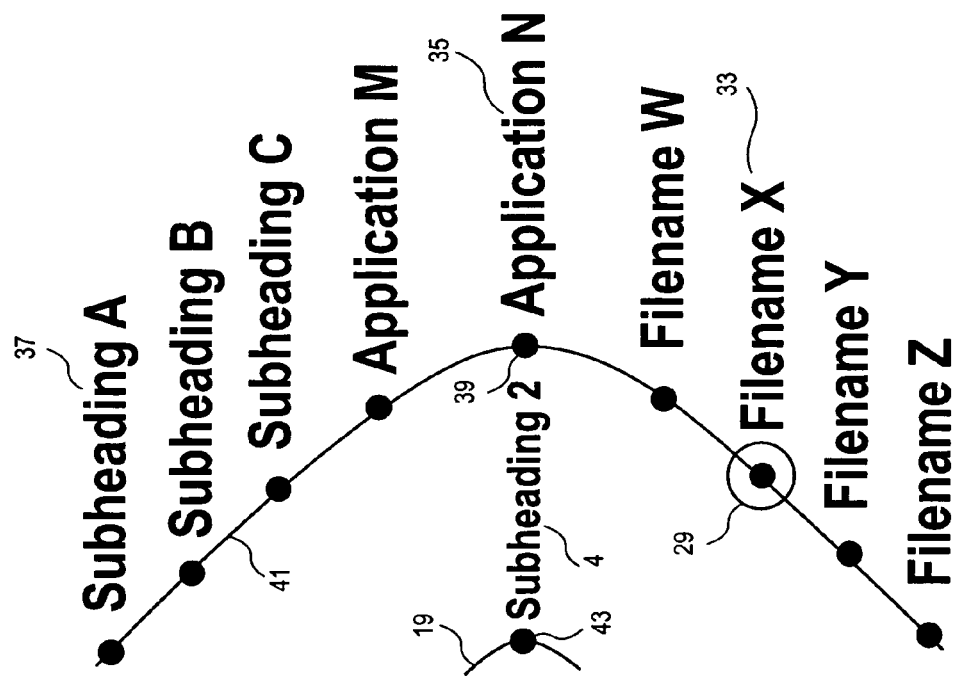
FIG. 6

LOOP MENU NAVIGATION APPARATUS AND METHOD

FIELD OF THE INVENTION

The present invention relates to computers. In particular, the present invention relates to an application chooser format for a data processing device.

BACKGROUND OF THE RELATED ART

Processors and memory devices may be getting smaller with advances in technology. As the processors and the memory devices get smaller, data processing devices that use the processors and the memory devices, may be made smaller and have more functionality than previous data processing devices. However, with the smaller size of the data processing devices, there may be several challenges to overcome. For example, as the data processing devices get smaller, input devices on the data processing devices may get smaller and, consequently, more difficult to use. As a result, it may be necessary to reduce the amount of input required from a user to perform tasks on the data processing device. An additional challenge is that smaller data processing devices typically require smaller screens which may be difficult to read. As such, data may need to be presented to the user in a more compact manner.

Certain data processing devices have been designed with screens that flip out in various ways. The flip-out screen may have dimensions as large as the largest dimensions of the overall data processing device when the flip-out screen is closed. However, even with the ability to flip out, the data processing device screen may still be very small and therefore still may need to present information to the user in a more compact manner.

One example of information that may need to be presented in a more compact manner to the user on the smaller screen is a hierarchy of files (e.g., applications, data files, . . . etc) stored on or accessible by the data processing device. In the current manner of presenting the file hierarchy, the headings, subheadings, applications, and filenames, may be branched along lines at right angles. This manner of presenting the file hierarchy may take up a significant amount of screen space. Because of the smaller screen, the number of filenames, applications, subheadings, and headings that may be viewed at once by the user may be limited. Because the user may only be able to view a small portion of the file hierarchy at a time, it may take the user a longer time to locate a file.

SUMMARY

This invention discloses a curved-listing file hierarchy and a preview window for displaying identifiers and preview information related to a plurality of computer files, applications, and headings on the screen of a data processing device.

BRIEF DESCRIPTION OF THE DRAWINGS

The present invention is illustrated by way of example and not limitation in the accompanying figures:

FIG. 2 shows an embodiment of a curved-listing file hierarchy and preview window with preview information of the user-selected file.

FIG. 3 shows an embodiment of a curved-listing file hierarchy with a user-selected image file and a corresponding preview of the image.

FIG. 5 shows an embodiment of the curved-listing file hierarchy and a user-selected subheading identifier.

FIG. 6 shows an embodiment of a curved-listing file hierarchy associated with the user-selected subheading identifier.

DETAILED DESCRIPTION OF THE INVENTION

The following description makes reference to numerous specific details in order to provide a thorough understanding of the present invention. However, it is to be noted that not every specific detail need be employed to practice the present invention. Additionally, well-known details, such as particular materials or methods, have not been described in order to avoid obscuring the present invention.

Figure 1:
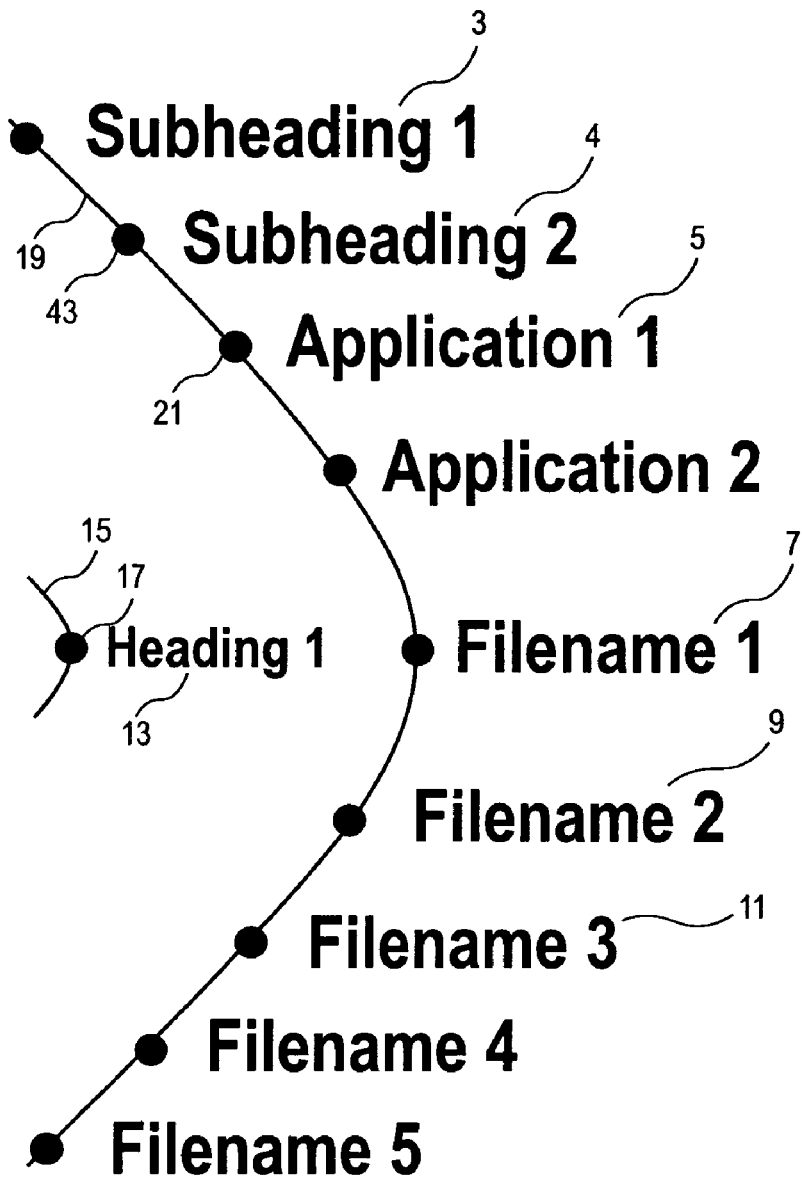
FIG. 1 shows an embodiment of a curved-listing file hierarchy.

Referring to FIG. 1, an embodiment of the invention is shown in the form of a curved-listing file hierarchy 19 for a data processing device. The curved-listing file hierarchy 19 may include identifiers such as Subheading One 3, Subheading Two 4, Application One 5, Filename One 7, Filename Two 9, and Filename Three 11 which may be associated with file hierarchies, applications, files, or other types of information accessible by the data processing device. The identifiers may have a corresponding identifier pointer such as the identifier pointers 43 and 21 next to the Subheading Two 4 and the Application One 5, respectively.

The curved-listing file hierarchy 19 may also have a central identifier such as Central Identifier Heading One 13. The Central Identifier Heading One 13 may be an identifier on a separate curved-listing file hierarchy such as a curved-listing file hierarchy 15. The Central Identifier Heading One 13 may also be next to a corresponding identifier pointer such as identifier pointer 17. The Central Identifier Heading One 13 may be related to the identifiers on the curved-listing file hierarchy 19 in a variety of ways. For example, in one embodiment, each of the subheadings, applications and files logically fall under Central Heading One 13 in a defined loop menu hierarchy. Moreover, the identifiers such as the Subheading One 3 and the Subheading Two 4 may have corresponding curved-listing file hierarchies associated with them. The identifiers, such as the Application One 5, may have a corresponding set of instructions that are executable by the computer when run. The identifiers such as the Filename One 7, the Filename Two 9, and the Filename Three 11, may be computer files, such as, but not limited to, text files, image files, and data files containing information for use by an application such as the Application One 5.

By presenting the identifiers, such as the Subheading One 3, the Application One 5, and the Filename One 7, that are related to the central identifier, such as the Central Identifier Heading One 13, with the curved-listing file hierarchy, such as the curved-listing file hierarchy 19, it may be possible to present more of the identifiers in a smaller space than if the identifiers were presented in a right angle hierarchy. In one embodiment, a file hierarchy curve's dimension, such as a width of the curved-listing file hierarchy 19, will vary depending on the number of the identifiers to be displayed at any given time. For example, the curve may be steeper to include more of the identifiers or may look more like a straight line if there are fewer of the identifiers to display. In addition, the curved-listing file hierarchy 19 may not display all the identifiers related to its central identifier. For example, the user may scroll between adjacent portions of the curved-listing file hierarchy 19 or multiple portions of the curved-listing file hierarchy 19 may be displayed adjacent to each other on the same screen. Various other methods of displaying the multiple portions of the curved-listing file hierarchy may be employed while still complying with the underlying principles of the invention.

The file hierarchy, for example a top-level file hierarchy, may not have a central identifier. In addition, some of the data processing devices may have screens that are too small to include the central identifier or the central identifier may be displayed at a different section of the screen.

Furthermore, the invention may not be limited to a curved listing. For example, other shapes, such as but not limited to, semi-circles, angled lines, and multiple curve listings may also be used. It may also be within the scope of the invention to use symbols or abbreviated identifiers in place of identifier text. Using the symbols or the abbreviated identifiers may save additional space on the screen.

Referring to FIG. 2, an embodiment of the invention is shown in the form of a curved-listing file hierarchy 19 and a preview window 23. As described above, the curved-listing file hierarchy 19 may be displayed with identifiers such as Subheading Two 4, Application One 5, and Filename Two 9. The identifiers on the curved-listing file hierarchy 19 may be displayed next to a corresponding identifier pointer such as identifier pointer 43. A selection indication such as Circle 29 may be used to select the identifiers, such as the Filename Two 9, in order to view preview information about a file associated with the identifier, such as the preview information shown in preview window 23. Besides the circle 29, other methods of selecting the identifiers may also be within the scope of the invention. The preview information about the identifier may include, but is not limited to, notes, text, data, and images. For example, if the identifier Filename Two 9 refers to a slide-show presentation file, the notes related to the slide-show presentation file, such as, Note A 25 and Note B 27, may be displayed in the preview window 23. The preview information in the preview window 23 may allow the user to refresh his or her memory about contents of the file without actually opening the file. In this way, the user may save time by avoiding opening files that aren't needed. In addition, the user may be able to obtain sufficient information from the preview window 23 about the file without actually opening the file. For example, if the user needed to know a date the presentation file was presented on, that information may be displayed in the preview window 23.

Referring to FIG. 3, one embodiment of the invention is shown in the form of a curved-listing file hierarchy 19 and a preview window 23 displaying preview information of an image file. Identifiers, such as the identifier Filename Three 11, may represent image files. Circle 29 may be used by a user to select the identifier, such as Filename Three 11, in order to view the preview information about the identifier. The preview information may be presented in the form of an image such as preview image 31 displayed in the preview window 23. The user may use the circle 29 to select the identifier by clicking an identifier, dragging the circle 29 to the identifier, or using arrow keys on a data processing device keyboard to move the circle 29 (or other selection graphic). Other methods of selecting the identifier with and without the circle 29 may also be within the scope of the invention.

Preview image 31 may not be as detailed as the image file when the image file is viewed in the image file's natural application. For example, the preview image 31 may contain fewer pixels or show less detail than if file Filename Three 11 were opened in the file's natural application. By viewing the preview image 31 of the image file, the user may be able to cycle through several image file identifiers without actually opening each image file in its natural application. Accordingly, the user may find the image file he or she is looking for in a long list of image file identifiers without having to open each individual file.

In addition to the preview image 31, the preview information displayed in the preview window 23 may also include information such as, but not limited to, the date the file was saved, data associated with the image, and other information. The preview images, such as preview image 31, may also be displayed for files that are not specifically image files. For example, the preview information about an application may include an image of that application's identifier icon. The images may also be used to indicate a status of the file. For example, if the file is locked or is read only, a symbol of a lock may be displayed. In another example, if the file associated with the identifier on the curved-listing file hierarchy is scanned by a virus scanner and found to be infected, an appropriate warning image may be displayed in the preview window 23.

The size of the preview window 23 may be adjusted according to the depth of the curve of the curved-listing file hierarchy 19. For example, if the curved-listing file hierarchy 19 has several identifiers on it such that the curve needs to be steep, the preview window 23 may be small. However, if the curved-listing file hierarchy 19 has only a few identifiers on it, then the preview window 23 may be increased in size according to the reduced curve of the curved-listing file hierarchy 19.

In one embodiment of the invention, the preview image 31 may be less detailed upon the user first selecting the identifier, but the preview image 31 may be enhanced by the data processing device the longer the user selects the identifier. For example, when the user first moves the circle 29 over the identifier pointer next to the identifier Filename Three 11, a simple preview image 31 may be shown. However, if the user does not move the circle 29 off of the identifier pointer next to the Filename Three 11's identifier, the data processing device may add detail to the preview image 31. Because the data processing device may add detail to the preview image 31 the longer the user selects the identifier, the user may select how much detail he or she needs to see before deciding whether to move on to the next image file identifier.

Figure 4:
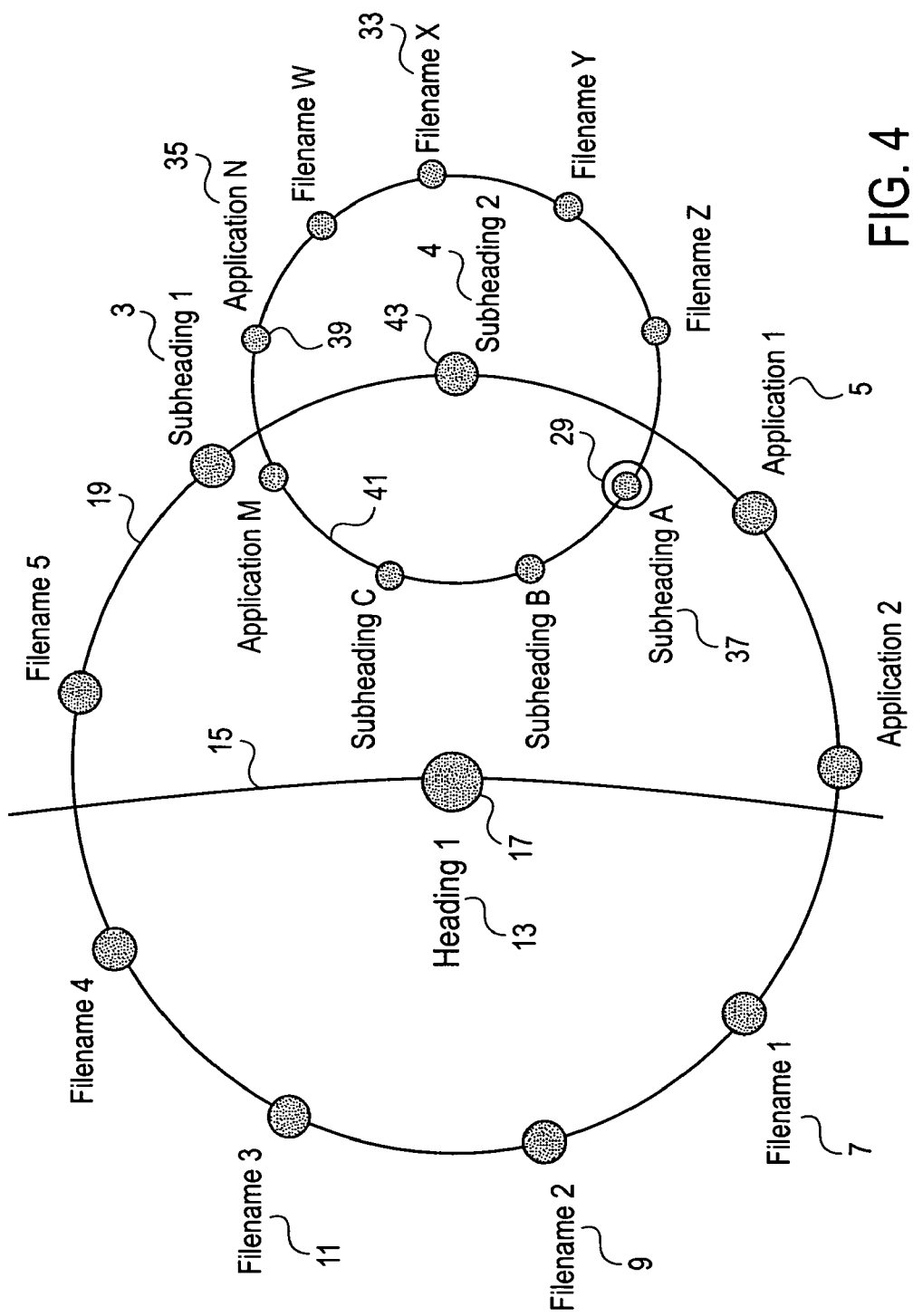
FIG. 4 shows an embodiment of the curved-listing file hierarchy in a circular structure form.

Referring to FIG. 4, an embodiment of the invention is shown in the form of a circular file hierarchy. Central Identifier Heading One 13 may be displayed next to identifier pointer 17 on curved-listing file hierarchy 15. A file hierarchy corresponding to the Central Identifier Heading One 13 may be displayed circumscribing the Central Identifier Heading One 13. For example, identifiers Subheading One 3, Application One 5, Filename One 7, Filename Two 9, and Filename Three 11 may be displayed (along with other identifiers) around the Central Identifier Heading One 13 on circular file hierarchy 19 (e.g., because they are logically related to Central Identifier Heading One 13 in some manner).

Each of the identifiers surrounding the Central Identifier Heading One 13 may be associated with their own set of files (e.g., which are beneath them in a file hierarchy). For example, the identifier Subheading Two 4, which is on the circle surrounding the Central Identifier Heading One 13, may have a corresponding set of the identifiers surrounding it. In the illustrated example, these include Application N 35, Filename X 33, and Subheading A 37, each of which is displayed next to corresponding identifier pointers such as identifier pointer 39 corresponding to Application N 35.

The embodiment illustrated in FIG. 4 shows file hierarchies displayed in circular patterns. In one embodiment, the curved-listing file hierarchies associated with each circular file hierarchy shown in FIG. 4 may be recreated by breaking the circular file hierarchy at any spot and curving out the file hierarchy to become a curve partially surrounding the central identifier. While the circular file hierarchies may be used in an embodiment of the invention, other shapes, such as, but not limited to, squares, rectangles, and triangles, may be used for the identifier pointers and the corresponding identifiers. Selection indicators such as Circle 29 may be used for several operations including, but not limited to, selecting a file to view, selecting an application to execute, or selecting a subheading in order to view the file hierarchy corresponding to the subheading.

The data processing device may add or remove the identifiers to the screen depending on the level of information the user wants to view at any one time. For example, if the user selects Subheading A 37 using the circle 29, or some other method of selecting a subheading, the file hierarchy related to the Subheading A 37 may be shown surrounding the Subheading A 37. However, the Central Identifier Heading One 13 and the file hierarchy surrounding Central Identifier Heading One 13 (except for identifier Subheading Two 4) may be removed in order to show a larger view of the file hierarchy surrounding the Subheading A 37. Otherwise, the file hierarchy surrounding the Subheading A 37 may be too small or include too much detail to be easily understood by the user. Although the embodiment illustrated in FIG. 4 does not include a preview window 23, the preview window 23 may be displayed on the screen with the circular file hierarchy. Whether or not the hierarchy is shown may depend on the size of the screen and the amount of space consumed by the circular file hierarchy.

Referring to FIG. 5, an embodiment of the invention is shown with curved-listing file hierarchy 19 and preview window 23. A user may move a selection graphic such as circle 29 to select an identifier such as Subheading Two 4 in order to view a file hierarchy related to the Subheading Two 4. Other methods of selecting the identifier may also be within the scope of the invention. Upon moving the circle 29, with the identifier pointer 43 related to the identifier Subheading Two 4, preview information regarding the Subheading Two 4 may be displayed in the preview window 23. In another embodiment, upon moving the circle 29 over the Subheading Two 4, the data processing device may display an abbreviated form of the file hierarchy related to the Subheading Two 4 in the preview window 23.

If the user selects the identifier Subheading Two 4, the identifier Subheading Two 4 may move to the center of the file hierarchy, (as shown in FIG. 6). Referring to FIG. 6, Subheading Two 4 may become a central identifier for a new curved-listing file hierarchy 41. The identifier Subheading Two 4 may be displayed next to an identifier pointer 43 on curved-listing file hierarchy 19 in the center of the curved-listing file hierarchy 41. The curved-listing file hierarchy 41 may include similar identifiers as shown on the curved-listing file hierarchy 19. For example, Subheading A 37, Application N 35, and Filename X 33 may be displayed on the curved-listing file hierarchy 41 next to the relative identifier pointers such as the identifier pointer 39. The selection Circle 29 (or other selection graphic) may be used to select the identifier in order to view preview information on the identifier in preview window 23. Other methods of selecting the identifiers with or without the circle 29 may also be within the scope of the invention. For example, in one embodiment, the entire subheading or application may be highlighted (i.e., rather than a separate identifier pointer). As indicated in FIG. 6, by moving the circle 29 over the identifier pointer next to the identifier for a text file—Filename X 33—the preview information, such as text body 45 corresponding to the Filename X 33, may be displayed in the preview window 23. Users may also move the circle 29 over the identifier pointer 43 to move back to the curved-listing file hierarchy 19, as shown in FIG. 5. In this way, the user may efficiently move between different levels of the curved-listing file hierarchy. Other methods of moving between the different levels of the curved-listing file hierarchies may also be within the scope of invention, such as, but not limited to, backspacing, arrow keys, and clicking on an input device.

Figure 7:
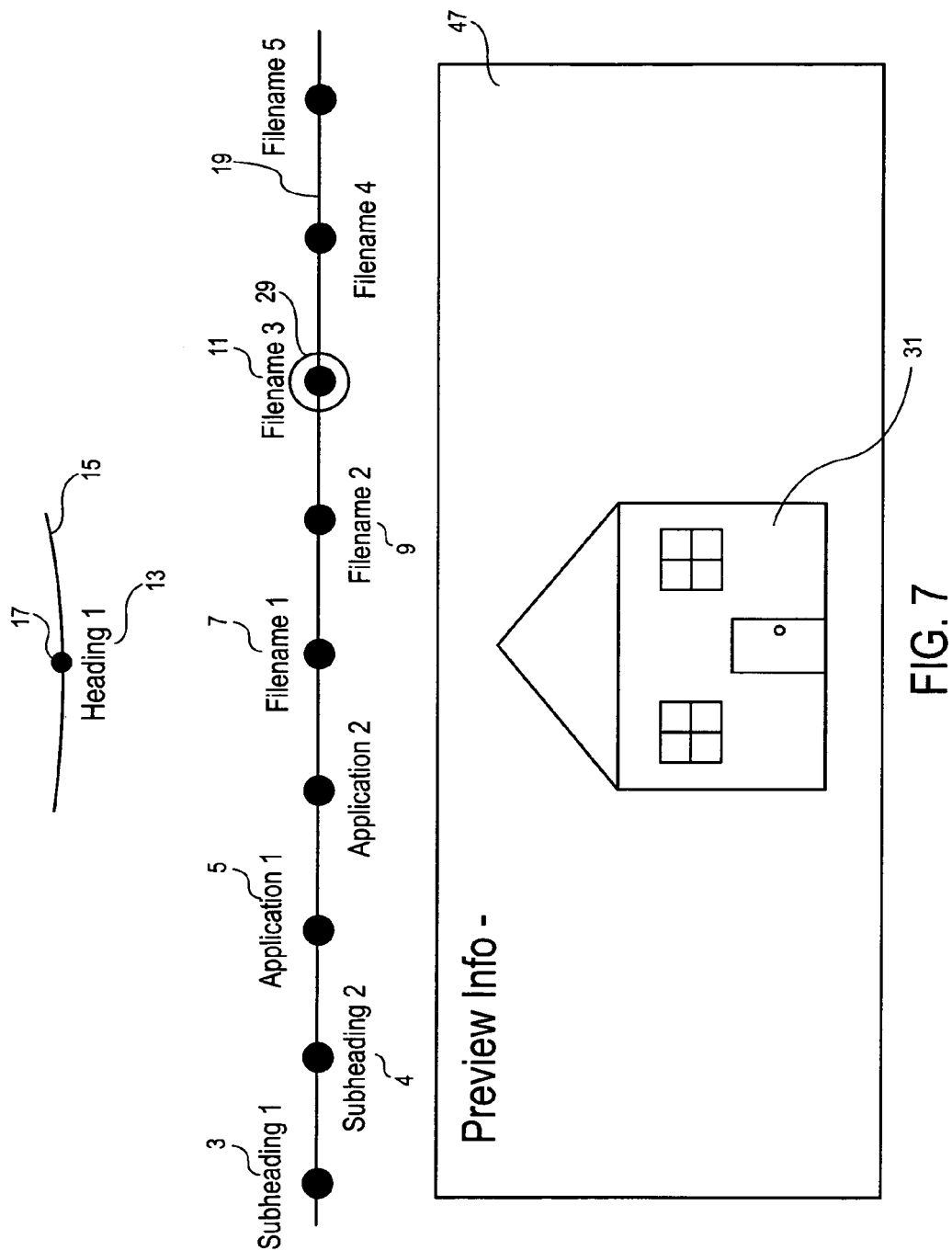
FIG. 7 shows an embodiment of a straight-line file hierarchy and a preview window.

Referring to FIG. 7, an alternate embodiment of the invention is shown in the form of a straight-line file hierarchy 19 below a Central Identifier Heading One 13 and a preview window 47. Identifiers, such as Subheading One 3, Subheading Two 4, Application One 5, Filename One 7, Filename Two 9, and Filename Three 11, may be displayed on the straight-line file hierarchy 19, in a similar fashion as the identifiers displayed on curved-listing file hierarchy 19. Because the identifiers may be displayed in a straight line, it may take more screen space to display the same amount of the file hierarchy as may be displayed in less space using the curved-listing file hierarchy 19. A preview window 47 may be located above or below the straight-line file hierarchy 19. The preview window 47 may display the same type of information shown in vertical preview window 23 (as seen in FIG. 6). In addition, the straight-line file hierarchy 19 may run horizontally, vertically, or diagonally on the screen. If the straight-line file hierarchy 19 runs vertically along one side of the screen, the preview window 47 may be put on the opposing side of the screen as the straight-line file hierarchy 19. Selection circle 29 may be moved along the identifier pointers on the straight-line file hierarchy 19 in the same manner as the selection circle 29 is moved along with the identifier pointers on the curved-listing file hierarchy 19 shown in FIG. 6. The selection circle 29 may also be used to move in between different levels of the file hierarchy by clicking on or moving the selection circle 29 to the identifier pointer 17 located above identifier Heading One 13 on file hierarchy 15. Preview image 31 may be skewed or scaled differently to fit the different dimensions of the preview window 47. However, the preview image 31 may also be kept at the same scale as the actual image in the image file and kept to one portion of the preview window 47.

Figure 8:
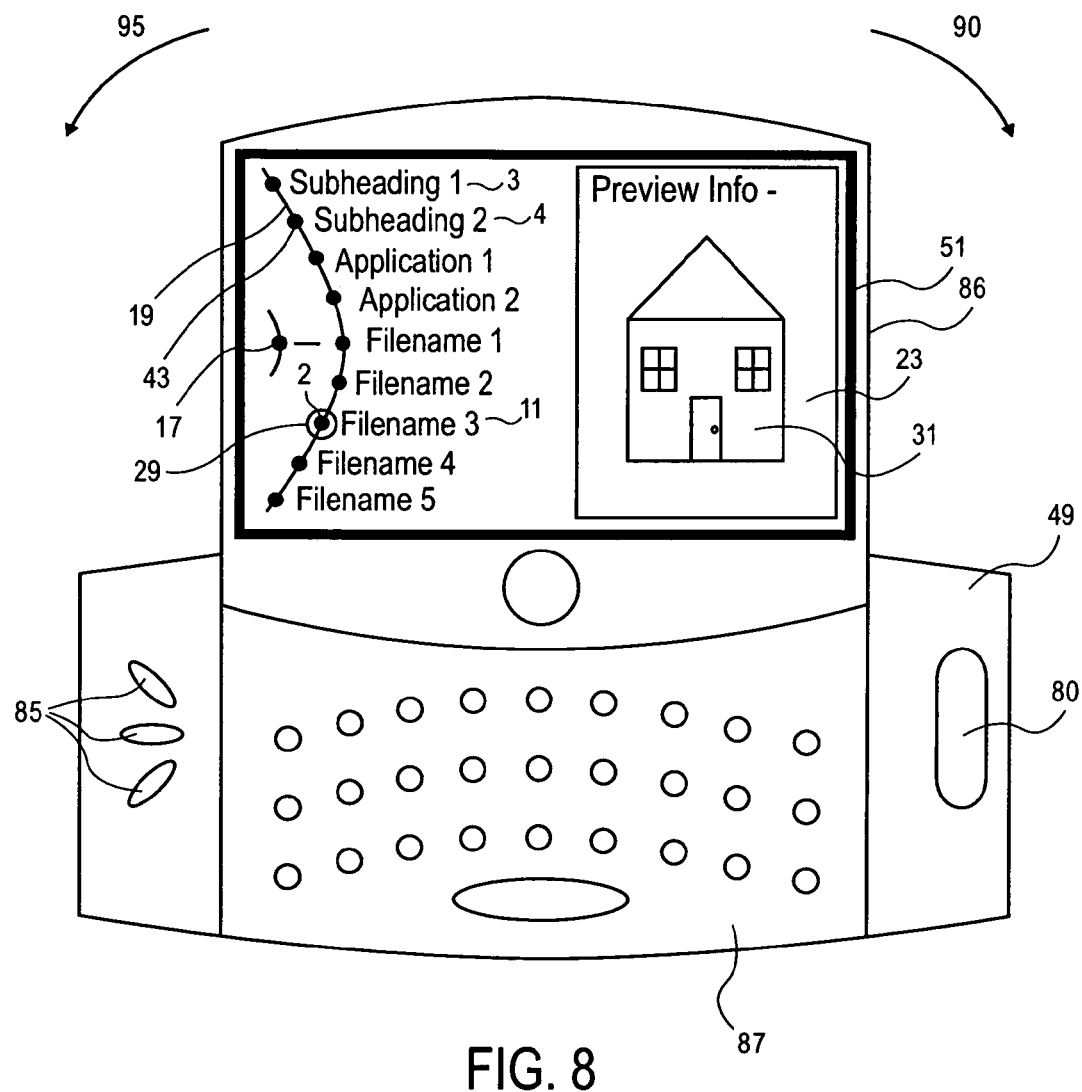
FIG. 8 shows an embodiment of the curved-listing file hierarchy and preview window on a screen of an embodiment of a Personal Digital Assistant.

Referring to FIG. 8, an embodiment of the invention is shown on the screen of an embodiment of a data processing device 49. The data processing device 49 may have a communication apparatus coupled to it for communicating with a network. The communication apparatus may be a device including but not limited to an antenna, a modem, and an infrared sensor. The data processing device 49 may have headings, applications, and files stored on it or accessible by it over the network. As seen on screen 51, of the data processing device 49, curved-listing file hierarchy 19 may be displayed with identifiers, such as Subheading One 3. A selection indicator circle 29 may be displayed around identifier pointer 2 next to identifier Filename Three 11 if the user selects identifier pointer 2 in order to view a preview image 31 of the file in a preview window 23 (as described in detail above). Alternatively, or in addition, an identifier pointer 2 may not be used. Rather, the selected subheading name, application name and/or file name may be highlighted on the screen. In one embodiment, only the identifier pointers, such as identifier pointer 43, are displayed on the screen 51. If only the identifier pointers are displayed, when the user moves the circle 29 over the identifier pointer, the text of the identifier name, such as Subheading Two 4, may be displayed next to the identifier pointer. The preview information may then be displayed in the preview window 23. Displaying the text of the identifier only when the selection circle 29 is over the corresponding identifier pointer, may allow more of the identifier pointers to be shown. In one embodiment, when an identification pointer (or subheading, application or filename) is selected, the text associated with that pointer will become larger, thereby making it easier to read. As seen in FIG. 8, the curved-listing file hierarchy 19 and preview window 23 may maximize the amount of information that can be shown on the small screen 51 of the data processing device 49.

In one embodiment, the data processing device 49 include one or more control knobs 80 and one or more buttons 85. The control knob may be rotated to rotate from one identifier (or pointer) to another along the curved-listing file hierarchy 19. When the file, application or subheading the user wishes to select is highlighted, the user may make the selection by pressing one of the buttons 85. Alternatively, or in addition, the control knob 80 may be depressed to make the selection.

In one embodiment, the display 86 on the data processing device 49 may be rotated clockwise or counter-clockwise to a "closed" position, as indicated by rotation arrows 90 and 95, respectively. When in a closed position, the screen may cover the data processing device's keyboard 87. However, in one embodiment, when the display is closed in this manner, the image on the display will flip (responsive to logic within the device 49) and the user may still access files, applications and subheadings via the curved-listing file hierarchy 19 by manipulating the control knob 80 and/or buttons 85 (i.e., in this embodiment, the control knob 80 and buttons 85 are not disabled when the screen is in a closed position).

Figure 9:
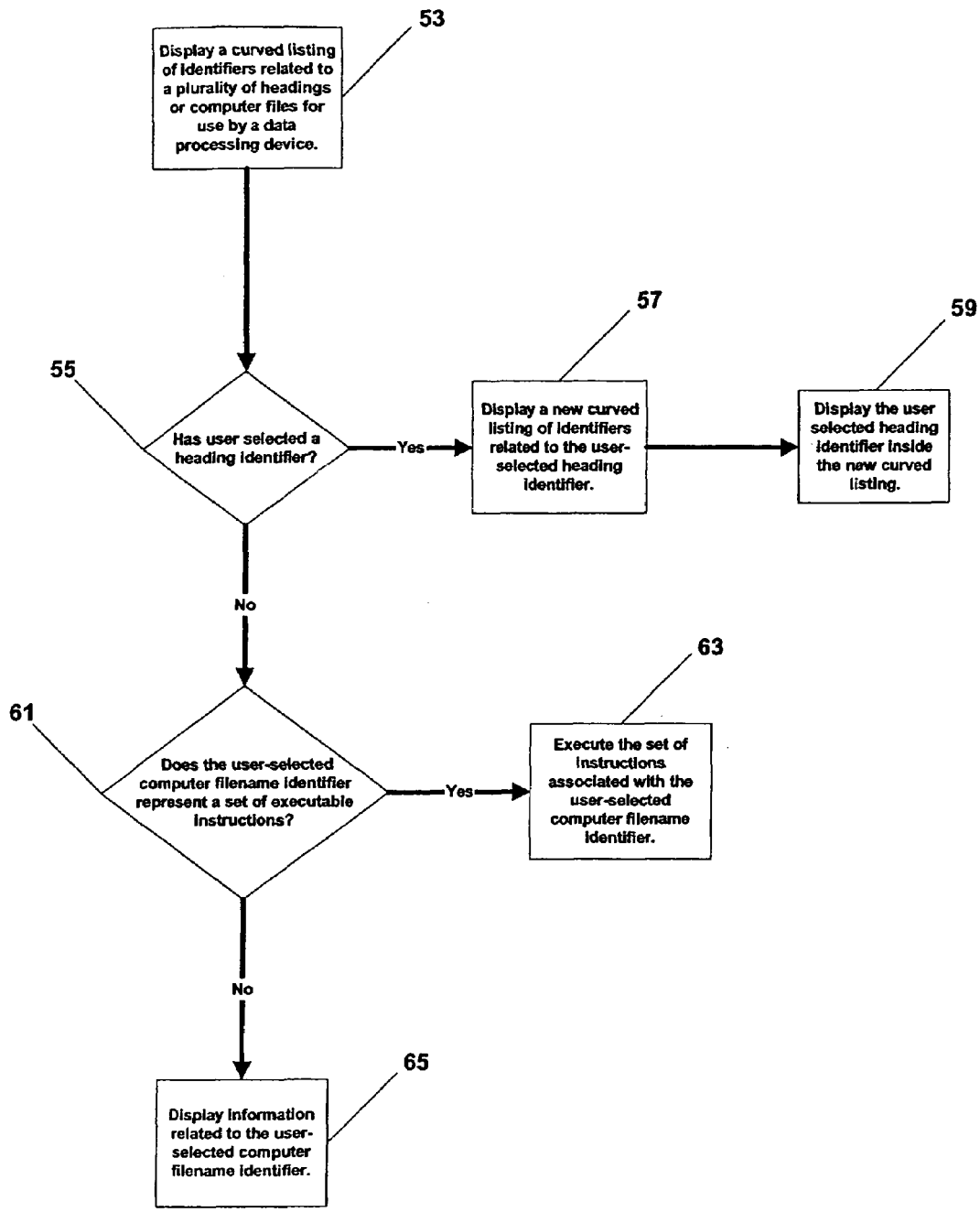
FIG. 9 shows an embodiment of a flowchart of a system's actions.

Referring to FIG. 9, an embodiment of the invention is shown in the form of a flowchart of a system's actions. At block 53, the system may display a curved listing of identifiers related to a plurality of headings or computer files for use by a data processing device. At decision block 55, the system may determine whether a user has selected a heading identifier. If the user has selected the heading identifier, then at block 57, the system may display a new curved listing of the identifiers related to the user-selected heading identifier. Then at block 59, the system may display the user-selected heading identifier inside the new curved listing. However, at decision block 55, if the user has not selected the heading identifier, the system may determine at decision block 61 whether the user has selected a computer filename identifier that represents a set of executable instructions. If the system determines that the user has selected a computer filename identifier that represents a set of executable instructions, then at block 63, the system may execute the set of instructions associated with the user-selected computer filename identifier. However, if the user selected a computer filename identifier that does not represent a set of executable instructions, the system may display information related to the user-selected computer filename identifier at block 65.

Figure 10:
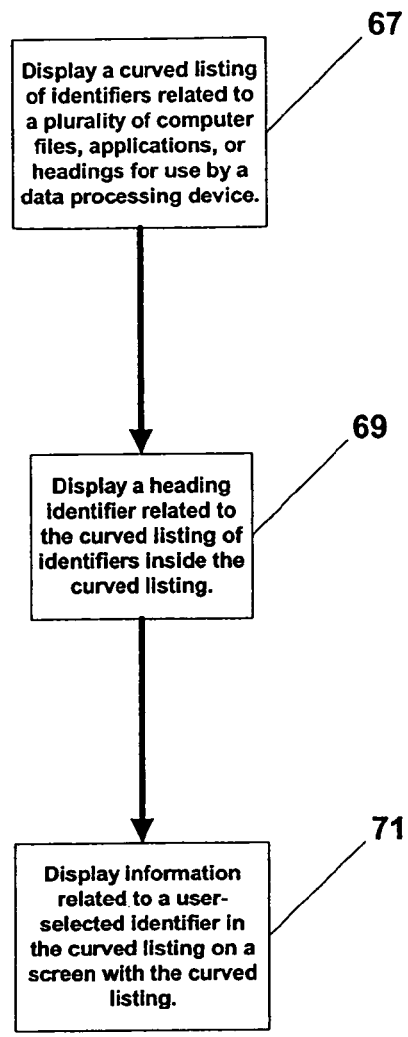
FIG. 10 shows an embodiment of a flowchart of a system's operations.

Referring to FIG. 10, an embodiment of the invention is shown in the form of a flowchart of a system's operations. A machine-readable medium includes any mechanism that provides (i.e. stores and transmits) information in a form readable by a machine (e.g. a computer). For example, machine-readable medium includes read only memory (ROM); random access memory (RAM); magnetic disc storage media; optical storage media; flash memory devices; etc. At block 67, instructions executed by a data processing device may cause the system to display a curved listing of identifiers related to a plurality of computer files, applications, or headings for use by the data processing device. At block 69, the instructions may cause the system to display a heading identifier related to the curved listing of the identifiers inside the curved listing. At block 71, the system may display information related to a user-selected identifier in the curved listing on a screen with the curved listing.

Figure 11:
FIG. 11 illustrates an embodiment of the curved listing hierarchy which employs graphical icons.

FIG. 11 illustrates one embodiment of a curved-listing file hierarchy 100 in which icons are used to identify subheadings, applications, files, or other types of information accessible by the data processing device. As illustrated, the selected icon 101 (i.e., a camera icon) for a photograph subheading is highlighted, making it stand out from the other icons. As the user scrolls through the loop menu 100, other icons may become similarly highlighted. In addition, in one embodiment, a highlight region (represented by dotted line 102) remains in a consistent area on the display and the icons on the loop menu move through that region. The principle of applying a consistent highlight region may be applied to any of the embodiments described above. In addition, the preview area 103 may contain a graphical indication of the content located within the particular subheading.

The embodiment shown in FIG. 11 also clearly demonstrates how relatively more viewable information will fit within the curved hierarchy 100 than with a standard file hierarchy. For example, when stacked up in a straight line menu, significantly fewer icons illustrated in FIG. 11 would be viewable at the same time (i.e., they would be moved off of the screen due to the lack of space).

Also illustrated in FIG. 11 is a heading bar 110 comprised of a date/time region 111, a battery meter indicator 112, and a signal strength indicator 113. Of course, various alternate graphical information may be displayed while still complying with the underlying principles of the invention.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic instructions. For example, the present invention may be downloaded as a computer program which may be transferred from a remote computer (e.g., a server) to a requesting computer (e.g., a client)

Throughout the foregoing description, for the purposes of explanation, numerous specific details were set forth in order to provide a thorough understanding of the invention. It will be apparent, however, to one skilled in the art that the invention may be practiced without some of these specific details. For example, while menu system was described above in the context of a small, portable device, such a limitation is not required for performing the underlying principles of the invention. Accordingly, the scope and spirit of the invention should be judged in terms of the claims which follow.

What is claimed is:

1. A data processing device, comprising:
   a display having a screen;
   a machine-readable medium;
   a plurality of computer files in said machine-readable medium and accessible by said data processing device; and
   a graphical user interface displayed on said screen, comprising:
      a plurality of identifiers and/or identifier pointers, each identifier and/or identifier pointer related to one or more of said plurality of computer files for use by said data processing device;
      a selection indicator to select one or more of said identifiers and/or identifier pointers;
      a curved listing of said plurality of identifiers and/or identifier pointers, wherein:
         only a portion of said curved listing is displayed on said screen at any given time; and
         the plane defined by said curved listing is slanted or parallel in relation to the plane defined by said display;
      wherein the selection indicator remains in a consistent position on the display and wherein, responsive to user input, the curved listing is visually rotated through the selection indicator one icon at a time, thereby causing the identifiers and/or identifier pointers which visually coincide with the selection indicator to become capable of being selected in response to additional user input; and
      a preview window to display information associated with a file related to an identifier and/or identifier pointer, said identifier and/or identifier pointer being selected by said selection indicator in said curved listing, said preview window displayed concurrently with said portion of said curved listing.

2. The data processing device of claim 1 further comprising an identifier and/or an identifier pointer displayed inside said portion of said curved listing.

3. The data processing device of claim 1 wherein an identifier and/or an identifier pointer of said plurality of identifiers and/or identifier pointers is a heading for use by said data processing device to organize another plurality of identifiers and/or identifier pointers.

4. The data processing device of claim 1 wherein said preview information is an image.

5. The data processing device of claim 4, wherein resolution of said image increases with respect to the length of time said image is displayed.

6. The data processing device of claim 1 wherein said curved listing is circular.

7. The data processing device of claim 1, further comprising a communication apparatus to allow said data processing device to communicate with a network.

8. The data processing device of claim 7 wherein said communication apparatus is selected from a list comprising an antenna, a modem, and a infrared sensor.

9. The data processing device of claim 1, wherein said graphical user interface further comprises a selection indication for highlighting a displayed identifier and/or a displayed identifier pointer.

10. The data processing device of claim 9, wherein said displayed preview information is of said associated identifier and/or said associated identifier pointer highlighted by said selection indication.

11. The data processing device of claim 9, further comprising a control knob for moving said selection indication to highlight a different identifier and/or a different identifier pointer.

12. The data processing device of claim 11, wherein said control knob is depressible for selecting said highlighted identifier and/or said highlighted identifier pointer.

13. A method, comprising:
   associating a plurality of identifiers and/or identifier pointers with a plurality of computer files, applications or other data for use by a data processing device;
   generating a curved listing of said plurality of identifiers and/or identifier pointers on a data processing device display;
   selecting one or more of said identifiers and/or identifier pointers with a selection indicator;
   displaying a only a portion of said curved listing on said data processing device display at any given time;
   displaying said portion of said curved listing along a plane slanted or parallel in relation to the plane of said display;
   maintaining the selection indicator in a consistent position on the display and visually rotating the curved listing through the selection indicator one icon at a time in response to user input, thereby causing the identifiers and/or identifier pointers which visually coincide with the selection indicator to become capable of being selected in response to additional user input; and
   displaying within a preview window, concurrently with said portion of said curved listing, information associated with a file, application or other data related to an identifier and/or identifier pointer, said identifier and/or identifier pointer selected by said selection indicator.

14. The method of claim 13 further comprising displaying a portion of a new curved listing of identifiers and/or identifier pointers related to a user-selected identifier and/or a user-selected identifier pointer wherein said user-selected identifier and/or said user-selected identifier pointer represents a heading.

15. The method of claim 13, further comprising displaying an identifier and/or an identifier pointer, related to said curved listing of said plurality of identifiers and/or identifier pointers, inside said curved listing.

16. The method of claim 13, wherein said information associated with the file, application or other data is an image.

17. The method of claim 16, further comprising increasing resolution of said image with respect to a specified length of time said image is displayed.

18. The method of claim 13, further comprising highlighting, with a selection indication, a displayed identifier and/or a displayed identifier pointer.

19. A graphical user interface ("GUI") executed within a display of a data processing device comprising:

a plurality of selectable icons arranged in a curved pattern on the display, wherein only a portion of the plurality of selectable icons is displayed on the display at any given time, the selectable icons correspond to applications, files or other data executable/usable on the data processing device, and the plane defined by the curved pattern is slanted or parallel in relation to the plane of the display;

a highlight region maintained in a fixed position on the display, wherein in response to user input, the curved listing is visually rotated through the highlight region one icon at a time, thereby causing the icons which visually coincide with the highlight region to become highlighted and further to become capable of being selected in response to additional user input; and an information window displayed concurrently with the portion of the plurality of selectable icons, the information window to display information associated with each highlighted icon.

20. The GUI as in claim 19 further comprising:

a heading bar including a date/time region for displaying the date and time a battery meter indicator to indicate battery life, and a signal strength indicator to indicate the strength of a wireless communication signal.

21. A machine-readable medium having program code stored thereon which, when executed by a machine, causes the machine to perform the operations of:

associating a plurality of icons with a plurality of applications, files or other data for use by a data processing device;

generating a curved listing of a portion of said plurality of icons on a data processing device display, wherein the plane defined by the curved listing is slanted or parallel in relation to the plane of the display;

maintaining a highlight region in a consistent position on the display and visually rotating the curved listing through the highlight region one icon at a time, thereby causing the icons which visually coincide with the highlight region to become highlighted and further to become capable of being selected in response to additional user input; and displaying an information window concurrently with the portion of the plurality of selectable icons, the information window to display information associated with each highlighted icon.

* * * * *